United States Patent
Roytblat et al.

(10) Patent No.: US 7,207,514 B2
(45) Date of Patent: Apr. 24, 2007

(54) METHODS AND SYSTEMS FOR CONTROL OF FILM TRANSPORT

(75) Inventors: Igal Roytblat, Newmarket (CA); Robert F. Frith, Stoney Creek (CA); Alexander Mezhibovsky, Toronto (CA)

(73) Assignee: IMAX Corporation (CA)

( * ) Notice: Subject to any disclaimer, the term of this patent is extended or adjusted under 35 U.S.C. 154(b) by 129 days.

(21) Appl. No.: 10/784,642

(22) Filed: Feb. 23, 2004

(65) Prior Publication Data

US 2004/0195424 A1    Oct. 7, 2004

Related U.S. Application Data

(60) Provisional application No. 60/449,014, filed on Feb. 21, 2003.

(51) Int. Cl.
    *B65H 59/38*    (2006.01)
(52) U.S. Cl. .................. 242/334.5; 242/412.1; 242/414.1
(58) Field of Classification Search .......... 242/334, 242/334.1, 334.2, 334.5, 364.1, 412.1, 412.2, 242/414.1, 538.1, 538.2; 226/108, 111
    See application file for complete search history.

(56) References Cited

U.S. PATENT DOCUMENTS

| | | | |
|---|---|---|---|
| 3,780,959 A | 12/1973 | Burth | |
| 3,823,890 A | 7/1974 | Potts | |
| 3,910,527 A | 10/1975 | Buhler et al. | |
| 3,913,866 A * | 10/1975 | Hankins | 242/414.1 |
| 4,169,566 A | 10/1979 | Boudouris et al. | |
| 4,172,231 A * | 10/1979 | d'Alayer de Costemore d'Arc et al. | 242/414.1 |
| 4,801,853 A * | 1/1989 | Lewis et al. | 242/412.2 |
| 4,807,107 A * | 2/1989 | Fincher | 242/412.2 |
| 5,106,185 A | 4/1992 | Blaschek et al. | |
| 5,202,801 A * | 4/1993 | Fukuda | |
| 5,209,422 A * | 5/1993 | Lee | 242/334.5 |
| 5,330,118 A * | 7/1994 | Yoshikawa | 242/414.1 |
| 5,474,245 A | 12/1995 | Gunday et al. | |
| 5,604,652 A * | 2/1997 | Nishida et al. | 242/334.4 |
| 5,720,442 A * | 2/1998 | Yanagihara et al. | 242/334.2 |
| 5,947,401 A | 9/1999 | Niccum | |
| 5,992,780 A | 11/1999 | Wilke et al. | |

FOREIGN PATENT DOCUMENTS

| | | |
|---|---|---|
| DE | 4221481 | 1/1993 |
| DE | 3808044 A1 | 9/1999 |

\* cited by examiner

*Primary Examiner*—William A. Rivera
(74) *Attorney, Agent, or Firm*—Kilpatrick Stockton LLP

(57) ABSTRACT

Methods and systems of controlling transport of film are disclosed. In one embodiment, a method of controlling a supply platter motor in a no-rewind film transport system, comprises receiving take-up platter control signal information from a take-up platter controller, processing the take-up platter control signal information, and controlling the supply platter motor based at least in part on the processed take-up platter control signal information.

21 Claims, 4 Drawing Sheets

FIGURE 1 – PRIOR ART

METHODS AND SYSTEMS FOR CONTROL OF FILM TRANSPORT

RELATED APPLICATIONS

This application claims priority to U.S. Provisional Patent Application Ser. No. 60/449,014 filed Feb. 21, 2003 entitled "Tape Supply and Takeup Transport Controls for Extremely Wide Range of Roll Sizes," which is hereby incorporated in its entirety by this reference.

FIELD OF INVENTION

The present invention relates generally to film transport systems. Although for brevity and for illustrative purposes, much of the following description is specifically directed to projection systems, the invention is of more general applicability, and the term "film" as used in this specification is to be understood as encompassing other media wound into or unwound from rolls, such as magnetic recording or other tapes. The present invention relates particularly to methods and systems for control of film transport.

BACKGROUND OF THE INVENTION

Conventional reel unit projection systems use horizontal platters to supply film to a projector and take-up the film that comes out of the projector in such a way that film roll rewinding is not necessary. Controls and configuration of conventional film transport systems that have been used for decades are described in patents by Willi Burth (U.S. Pat. No. 3,780,959), and Edwin M Potts (U.S. Pat. No. 3,823,890). These types of film transport systems supply film to the projector by removing film from the center of the film roll via a pay-out device located concentrically on the supply platter. Film that has gone through the projector gets wound onto a removable hub that is located concentrically on the take-up platter. At the end of the show the hub on the take-up platter is removed so that the film can be removed via the pay-out device at the center of the platter for the next showing. The removed hub is inserted onto an empty platter to take up film again. With the conventional type no-rewind film transport systems, there is a drive motor for each platter. The supply platter controller uses a control feedback signal derived from the pay-out device film position sensor or sensors to maintain or help maintain the correct angular supply platter speed. The take-up platter controller uses a signal from a dancer arm to maintain the correct angular take-up platter speed. The dancer arm typically actuates an analog device such as a potentiometer.

These film supply and take-up transports are designed to be as low a cost as possible and to minimize time required of the projectionist for film handling. U.S. Pat. No. 4,169,566 by Angelo Boudouris et al. is another variation of the same type of film transport, but with a simplified drive system with the intent to further reduce the cost of the film transport unit. The only projectionist involvement required for no-rewind film transports is the short time it takes to rethread the film transport and the projector prior to each show. These systems have a history of being effective and play an important part in keeping the theatre capital and operating costs down.

When these conventional film transports are scaled up to handle larger film loads they become more expensive and suffer a performance limitation for a wide range of film platter loads. The supply platter control system can not be tuned to one set of parameters that will achieve stable operation for film roll sizes that range from a few pounds (i.e. trailers) to several hundred pounds. When the roll size is such that the tuned parameters are not able to control the supply platter smoothly, side effects such as film roll distortion, film roll shifting, film roll cinching, and supply platter control instabilities can cause the film to become damaged. Cinching is when a section of the film roll begins to move with respect to another section of the film roll. Repairing of large format film prints, such as 15/70 format, or repairing equipment damaged by the high forces that occur when Estar based film is pulled apart is expensive and generally considered unacceptable by theatre operators.

The limitation of these conventional systems lies in the ability of the supply platter control system to control a wide range of film platter loads. In conventional no-rewind film transport system the supply platter feedback mechanism are all similar in that they leave a pay-out device at the center of the supply platter. The pay-out device acts as a mechanical interface that allows film to be drawn off the inner radius of the film roll and redirects it to the film roller network that transports film to the projector. Position of the film leading into the pay-out device is fed back to the supply platter controller to control the supply platter. The section of film leading into the pay-out device can be referred to as the "lead-in" film. These pay-out devices on conventional no-rewind film transports generally all have the similar limiting range of detecting lead-in film position. When the film lead-in position exceeds the detecting limit the lead-in film begins to wrap its self about the outer circumference of the pay-out device. It is this narrow feedback range used to control the wide range of film platter loads that limits the supply platter control system's ability to remain stable.

Supply platter instability usually occurs during and just after the supply platter ramps up to running speed that leads to the side effects mentioned above. During ramp up the supply platter should pay out film at the rate that matches the rate the projector requires film. If there is a small rate mismatch the lead-in film position remains within the limits of the film position sensing range. As the rate mismatch increases the position of the lead-in film moves outside the position sensing limits. When film begins to wrap it self about the pay-out device there is no additional feedback to indicate the magnitude of the lead-in film positional error. To correct for the rate mismatch the supply platter has to be accelerated, if the platter is moving too slowly, or decelerated if it was moving too quickly. The platter angular speed continues to change to get the film back to within the film position sensor's sensing range. When within the sensing range the supply platter acceleration or deceleration condition is removed. The longer the supply platter has been accelerating or decelerating the greater the chance the lead-in film will quickly pass through the position sensing range. When this happens the film wraps itself about the pay-out device in the opposite direction at which time the supply controller will decelerate the platter that is moving too quickly or accelerate the platter if it is moving too slowly. This over and undershoot cycling will continue, sometimes for quite a while, until the lead-in film remains settled within the positional sensing range. Conventional configurations of the way film leads into the pay-out device generally do not provide a way to increase the film position sensing range by any dramatic amount.

A factor that contributes to the difficulty of keeping the lead-in film within the film position sensing range is being able to determine a value of platter acceleration or deceleration used for platter angular speed correction that will work for both the smallest and largest film platter load at any one specific inner roll radius. The torque required to accelerate a film platter load is proportional to the rotational inertia of the film and platter. Given that the rotational inertia of a film roll is proportional to the film roll radius to the fourth power, then it becomes readily apparent that the rotational inertia for a few pounds of film will be hugely less than 500 lbs. of film. There is also the difference in rotational inertia between the small and large platters that will contribute further to the problem.

Generally there are no feedback parameters available on conventional film transport systems to indicate platter load size to the platter controller and, thus, it is not possible to modify the torque used to accelerate the platter accordingly. If a constant torque is used to accelerate the film platter load then the magnitude of the ratio of the angular acceleration between small and large platter load will be proportional to the magnitude of the rotational inertia ratio. Since the difference in rotational inertia between small and large platter loads is large this will mean that ratio of acceleration between small and large platter loads will be large for a given applied torque. A problem occurs in that the required torque profile needed to accelerate a large film platter load for stable platter control will be excessive for small film platter loads leading to control instabilities. In these situations the under and over-shoot cycling continues to diverge from reaching the steady state operating condition and the projectionist has to stop the projector. If the projector is not stopped, such as when the projectionist is not present, too much film wraps around the pay-out device and tightens onto itself causing extensive damage to the print and possible damage to the projection equipment. In other situations the oscillations continue over a long enough period of time, the motor heats up substantially causing a thermal cutout condition to occur. Both scenarios lead to a situation of a lost show or shows.

Generally, conventional supply film position sensing systems that have been used extensively to date have similar lead-in position sensing range and do not take film platter load size into account in the platter control system. The following patents describe different film supply position sensing systems used in no rewind film transport systems: a swing arm with optical cam analog feedback is disclosed in U.S. Pat. No. 3,823,890; a swing arm with feedback from limit switches is disclosed in U.S. Pat. No. 4,169,566; and optically sensing film position is disclosed in U.S. Pat. No. 5,992,780.

SUMMARY OF THE INVENTION

The present invention relates to methods and systems for film transport and allows a film transport system to be used for an extremely wide range of film roll sizes that can be as small as a few pounds and as large as over 500 lbs. Large format theatres such as Imax Theatres expect the capability to show a variety of short and long film presentations from the same film transport system. As long film presentations become longer the capability of these film transport control system becomes problematic. The invention overcomes the control instability problems cost effectively and the invention can be tailored to allow quick upgrading of many film transport systems presently being used to provide the needed longer film play capability.

In one embodiment, a method of controlling a supply platter motor in a no-rewind film transport system, comprises receiving take-up platter control signal information from a take-up platter controller, processing the take-up platter control signal information, and controlling the supply platter motor based at least in part on the processed take-up platter control signal information. The method can further comprise receiving supply platter motor speed or positional signal information and take-up platter motor speed or positional signal information and processing the supply platter motor speed or positional signal information and take-up platter motor speed or positional signal information, wherein the supply platter motor is controlled based at least in part on the processed supply platter motor speed or positional signal information and the processed take-up platter motor speed or positional signal information.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
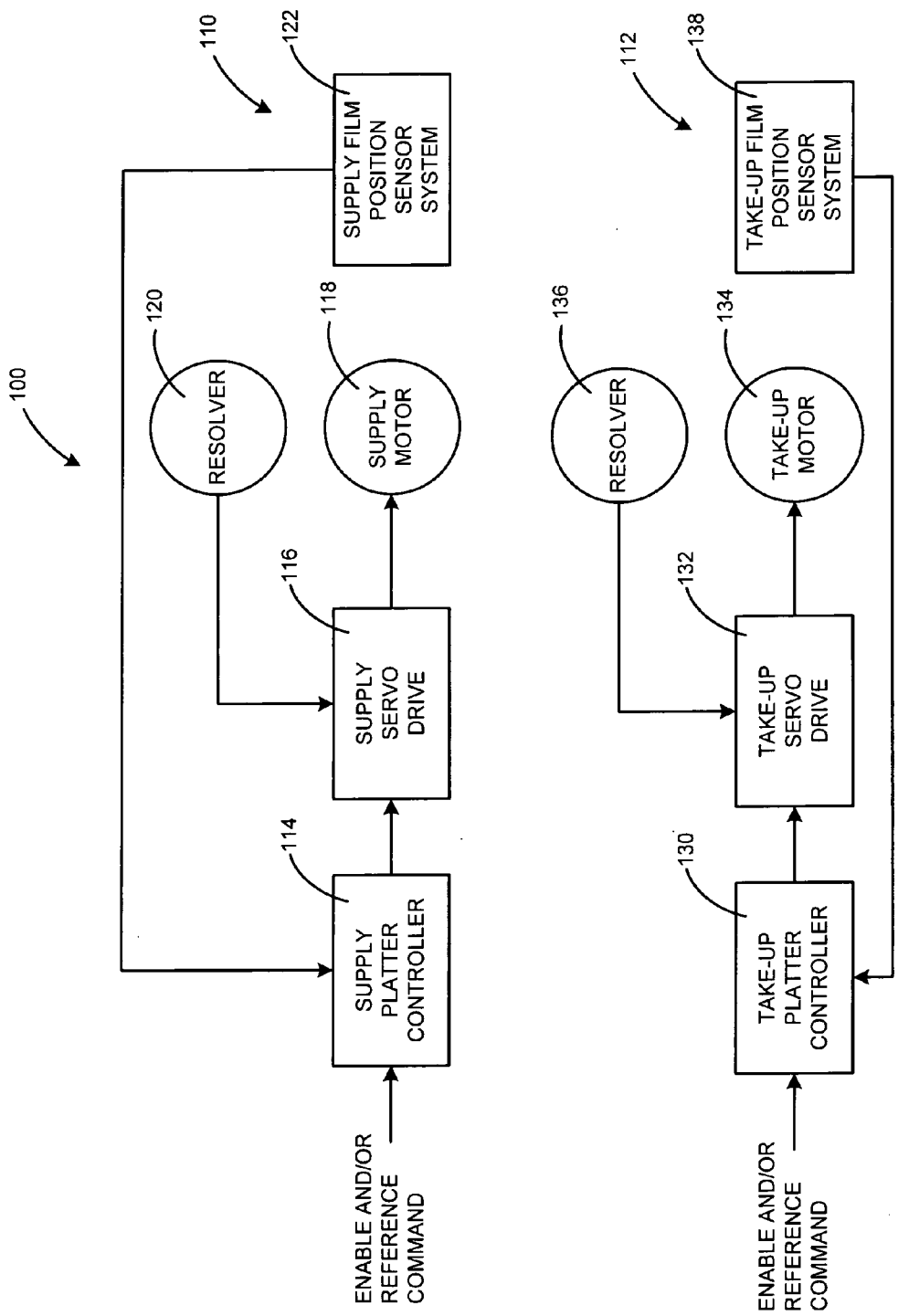
FIG. 1 is a block diagram illustrating a conventional film transport system.

Referring now to the drawings in which like numerals indicate elements throughout the several figures, FIG. 1 is a block diagram illustrating a conventional no rewind film transport control system 100. The system 100 includes a supply platter control system 110 and a take-up platter control system 112. The supply platter control system 110 includes a supply motor 118 that can drive a supply platter (not shown). In one embodiment, the supply motor 118 is a brushless motor. The supply motor 118 can be driven by a supply servo drive 116. In one embodiment, when the supply motor 118 is a brushless motor and the supply servo drive 116 is a brushless motor drive, angular feedback of the supply motor rotor position can be required for motor stator commutation. A resolver 120 can produce supply motor positional signals and can transmit these signals to the supply servo drive 116. A supply platter controller 114 can supply a supply platter control signals to the supply servo drive 116 in order to control the supply motor 118. The supply platter controller 114 can receive an enable and/or reference command to drive the supply motor 118. The supply platter controller 114 can also receive feedback signals from a supply film position sensor system 122.

The take-up platter control system 112 includes a take-up motor 134 that can drive a take-up platter (not shown). In one embodiment, the take-up motor 134 is a brushless motor. The take-up motor 134 can be driven by a take-up servo drive 132. In one embodiment, when the take-up motor 134 is a brushless motor and the take-up servo drive 132 is a brushless motor drive, angular feedback of the motor rotor position can be required for motor stator commutation. A resolver 136 can produce take-up motor positional signals and transmit these signals to the take-up servo drive 132. A take-up platter controller 130 can supply take-up platter control signals to the take-up servo drive 132 in order to control the take-up motor 134. The take-up platter controller 130 can receive an enable and/or reference command to drive the take-up motor 134. The take-up platter controller 130 can also receive feedback signals from a take-up film position sensor system 138. In the conventional system 100, the take-up platter and supply platter are mechanically independent and only controlled by their respective controllers.

The take-up platter control system 112 used in the conventional no rewind film transport control system 100 does not suffer from instability that the supply platter control system 110 does over the same wide range of film roll sizes. This can generally be explained by at least the following two reasons.

The first reason is that the take-up platter has a large film position sensing range capable of providing feedback for greater mismatches between the rate at which the projector puts out film and the rate that the take-up platter can wind up the film. There is always film tension between the take-up film position sensor system 138 and the take-up platter, hence, the sensor system 138 device provides a continuous accurate indication of what the take-up platter is doing. This is not the case with the supply platter film position sensor system 122. The supply platter position sensing range is narrow and in some designs there are only two range limit detection devices. During the time the film exceeds the position sensing range or the film position cannot be accurately determined within the nominal range, the feedback signal from the supply film position sensor system 122 does not provide the supply platter controller 114 with an accurate enough indication of what the supply platter is doing. In particular this becomes a problem during the time the supply platter is being accelerated up to projection speed and constant angular speed corrections need to be made. This limited accuracy in the supply platter feedback signal causes angular speed control to become unstable.

The other factor contributing to supply platter instability is that the range of required drive torque is much less for a take-up platter than a supply platter for the same range of film platter loads. This is because the relationship between angular acceleration and the rotational inertia for a supply and take-up film roll is different based on the way film is configured on the platter. For the take-up platter the maximum angular acceleration occurs at the beginning of the film roll that is also when the film roll rotational inertia is at its lowest magnitude. As film roll size increases angular acceleration on ramp up decreases proportionately with the film roll outer radius and the required torque increase is proportional to the film roll radius to the third power. Changes in required torque for the take-up platter at the beginning of a film are only dependent on the size of the empty platter. On the supply platter, the rotational inertia is at its maximum and very dependant on the size of the film roll and platter. The required torque is proportional to the roll radius to the fourth power. As more film is wound off the supply platter the rotational inertia decreases as well as the required angular acceleration during ramp up. From these relationships it is apparent that for different film roll sizes the greatest range of required drive torque takes place at the end of the film roll for the take-up platter and at the beginning of the film roll for the supply platter. The combination of lower torque demands and greater film position sensing range and accuracy, makes the take-up platter control system 112 much more robust in terms of angular speed stability when responding to changes in speed.

Figure 2:
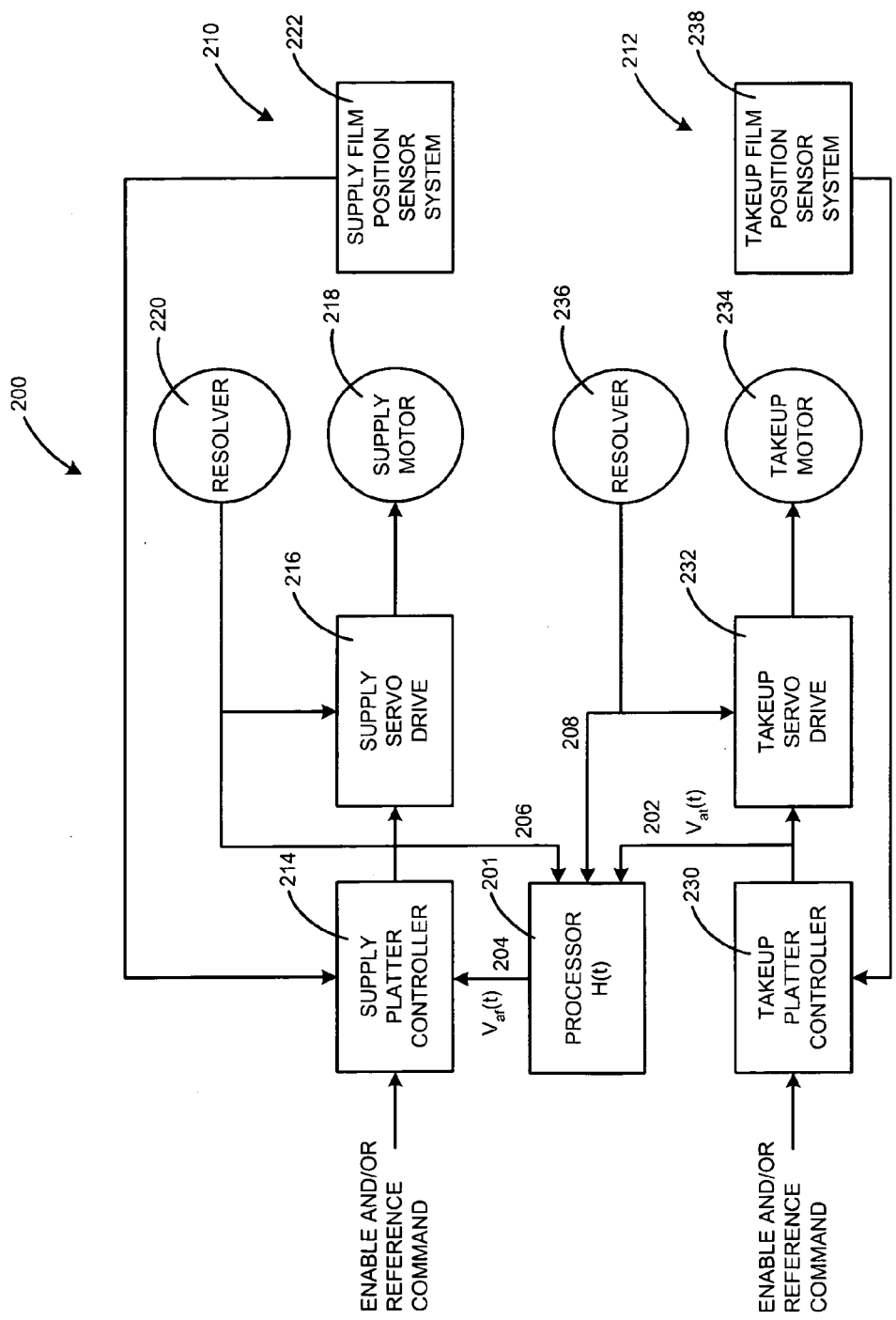
FIG. 2 is a block diagram illustrating an exemplary film transport system according to one embodiment of the present invention.

FIG. 2 is a block diagram of a no rewind film transport control system 200 of one embodiment of the present invention. The no rewind film transport control system 200 includes a supply platter control system 210 and a take-up platter control system 212. The supply platter control system 210 can be similar to the conventional supply platter control system 110 illustrated in FIG. 1. The supply platter control system 210 can have a supply motor 218 that drives a supply platter (not shown). The supply motor can be driven by a supply servo drive 216 and a supply platter controller 214 can supply a supply platter control signal to the supply servo drive 216 to drive the supply motor 218. The supply platter controller can receive an enable and/or reference command to drive the supply motor 218 and can receive signals from a supply film position sensor system 222. The supply servo drive 216 can receive supply motor positional signals 206 from a resolver 220.

The take-up platter control system 212 can be similarly configured to the take-up platter control system 112 as shown in FIG. 1. The take-up platter control system 212 can have a take-up motor 234 that drives a take-up platter (not shown). The take-up motor 234 can be driven by a take-up servo drive 232 and a take-up platter controller 230 can supply a take-up platter control signal to the take-up servo drive 232 to drive the take-up motor 234. The take-up platter controller can receive an enable and/or reference command to drive the take-up motor and can receive signals from a take-up film position sensor system 238. The take-up servo drive 232 can receive take-up motor positional signals 206 from a resolver 236.

In one embodiment of the present invention, a processor 201 can receive the take-up platter control signal 202, process the signal 202, and provide the processed signal 204 to the supply platter controller 214. The processed signal 202 can be used by the supply platter controller 214, in combination with feedback signals from the supply film position sensor system 222, to generate a supply platter control signal. The processor 201 can be internal to or external from the supply platter controller 214 or take-up platter controller 230 and can process the take-up platter control signal 202 through the use of a transfer function H(t). The transfer function can be expressed as Equation 1 below:

$$H(t) = K \cdot \frac{V_{af}(t)}{V_{at}(t)} \qquad \text{Equation 1}$$

where $V_{af}(t)$ is the desired angular velocity of the supply platter and $V_{at}(t)$ is the angular velocity of the take-up platter.

Significant performance improvement of the film transport system 200 comes about by taking control signal information such as the take-up platter control signals 202, from the take-up platter controller 230 to establish a stable angular platter speed reference for the supply platter controller 214. When this is done the supply platter controller 214 becomes significantly less dependant on the feedback signals from the supply film position sensor system 222 to determine the required angular supply platter speed. If control based upon the take-up platter control signals is perfect, it may even be possible to eliminate the supply film position sensor system 222 entirely. However, in most cases some drift is likely that the sensor system 222 is required to eliminate. With a reduction in the amount of angular acceleration correction needed it becomes possible to achieve stable supply platter operation over a much wider range of supply film platter loads than presently possible with conventional no-rewind film transport systems.

When film is removed from a supply platter and starts winding onto an empty take-up platter the inner radius of the supply platter film roll increases at the same rate as the outer radius of the film roll on the take-up platter. The relationship remains unchanged throughout the film roll which means the take-up and supply platter angular speeds are very close. The slight difference between take-up and supply platter angular speeds is dependent on the amount of film that has to be removed from the supply platter for threading the projection system before the film starts winding onto the take-up platter hub. The angular platter speed profile as a function of time can be described by the following expression:

$$V_a(t) = \frac{s}{2 \cdot \sqrt{\pi \cdot (dts + \pi \cdot r_h^2)}} \quad \text{Equation 2}$$

Where:
"s" is linear speed of film (in inches/second);
"d" is film thickness in inches (i.e. typically 0.0055 inches);
"$r_h$" is the removable platter film hub outer radius in inches;
"$\pi$" is approximately 3.14;
"t" is the time in seconds; and
"Va" is the angular platter speed in revolutions/second.

Since the take-up and supply platter angular speed are closely matched through out the film roll it is possible to use the take-up platter control signal 202, which is the take-up platter's angular speed command, and use it as the angular speed reference for the supply platter. By doing this the magnitude of the angular speed correction derived from the supply film position sensor system 222 that is applied to the supply platter is significantly reduced.

As long as the supply platter starts at the beginning of a film roll and the take-up platter starts from empty then the transfer function H(t) can be expressed as a ratio as shown in Equation 3 below.

$$H(t) = K \cdot \frac{V_{af}(t)}{V_{at}(t)} \approx K \quad \text{Equation 3}$$

Where:
"$V_{af}(t)$" represents the required angular speed of the supply platter as a function of time; and
"$V_{at}(t)$" represents the required angular speed of the take-up platter as a function of time.

What is apparent for this scenario of starting at the beginning of the film roll on the supply platter and an empty take-up platter is that the transfer function is not dependent on time and is a constant. Therefore regardless of linear film speed or film thickness the transfer function does not change. The magnitude of the transfer function used by the processor 201 would be 1 for this scenario, however, mismatches in platter motor performance, platter frictional loads, and differences in the gains of the servo drivers can require the take-up platter controller output signal $V_{at}(t)$ to be corrected by a correction factor "K", as indicated in the transfer function in Equation 3. This can only need to be determined once for the specific take-up and supply platter combination. The correction factor generally would not need to be updated over time as long as the motor or driver are not replaced and the platter frictional load does not change.

For this scenario the only change that is generally required to the no-rewind film transport controllers is to establish a communication link between the supply platter controller 214 and take-up platter controller 230. This can be achieved by modification to the software and no additional sensors may be necessary. This is a very cost affective solution to upgrading existing large format no-rewind units. The processor 201 can be located in the supply platter controller 214, the take-up platter controller 230 or alternatively can be located external to either controller.

When there is already film on the take-up platter and film is being drawn from the beginning of a film roll on a supply platter, then the angular speed of the take-up platter will be different than that of the supply platter at any instant in time. Both platters will still have a motion profile that can be described by Equation 2 however the motion profiles will be shifted by a fixed amount of time from when they started. This means that the transfer function H(t) can become dependent on time and can have a magnitude that continuously changes as the take-up and supply film roll radius changes.

If roll radius of the supply platter and take-up platter are different by a small amount the transfer function can only change in magnitude by a small amount over time. It is still possible to operate the supply platter, as described above with the take-up platter control signal 202, with adequate control under this circumstance. If the supply and feed roll radius are different by a significant amount then there will be a greater dependence on the acceleration correction that is derived from the supply film position sensor system 222. This can mean that the magnitude of the acceleration correction can have to increase as well to compensate for the greater error between the derived and required angular speed of the supply platter which can mean that the supply platter control system 210 can start to approach instability problems again.

For the situation when the supply and take-up film roll radius are significantly different additional information can be required to derive H(t) in terms of the $V_{af}(t)$ and $V_{at}(t)$. Both the supply and take-up platter motion profile can be defined with their own time shift of t1 and t2 from their respective roll start times. For the supply platter the motion profile $V_{af}(t1+t)$ can be expressed as follows in Equation 4:

$$V_{af}(t_1 + t) = \frac{s}{2 \cdot \sqrt{\pi \cdot (d(t_1 + t)s + \pi \cdot r_h^2)}} \quad \text{Equation 4}$$

For the take-up platter the motion profile Vat(t2+t) can be expressed as follows in Equation 5:

$$V_{at}(t_2 + t) = \frac{s}{2 \cdot \sqrt{\pi \cdot (d(t_2 + t)s + \pi \cdot r_h^2)}} \quad \text{Equation 5}$$

The transfer function H(t) can be reduced and expressed as follows in Equation 6:

$$H(t) = K \cdot \frac{V_{af}(t_1 + t)}{V_{at}(t_2 + t)} = K \cdot \sqrt{\frac{d(t_2 + t)s + \pi \cdot r_h^2}{d(t_1 + t)s + \pi \cdot r_h^2}} \quad \text{Equation 6}$$

If the no rewind film transport system 200 has to start when supply and take-up film roll radii are significantly different and both are not at the beginning of the roll then the magnitude of Vaf and Vat can be determined from information obtained from the supply and take-up platter motor positional sensors. Supply motor positional signals 206 can be transmitted by resolver 220 and input to the processor 201. Take-up motor positional signals 208 can be transmitted by resolver 236 and input to the processor 201. The processor 201 can also receive the take-up platter control signals 202 and process the signals using transfer function H(t), such as for example shown in Equation 6. The processed signals 204 can be input to the supply platter controller 214 and used by the supply platter controller 214 to determine supply platter control signals.

If the projector advances at a slow enough rate, the supply platter can advance film with only the feedback signals from the supply film position sensor system 222. When the projector advances a specific number of frames or at a specific frame rate it is possible to calculate the radius of each film roll. The amount of film that the projector advances can depend on the resolution of the angular positional feedback signals 206, 208. The lower the resolution the longer the film needs to be advanced to get accurate enough information to determine the roll radius. The radii of the film rolls can be represented by Equations 7 below:

$$r_f = \frac{S}{2\pi V_{af}}; r_t = \frac{S}{2\pi V_{at}} \quad \text{Equations 7}$$

where $r_f$ is the unwinding radius, $r_t$ is the take-up radius, and $V_{af}$, $V_{at}$ are the supply and take-up platter angular speeds in revolutions/s respectively, e.g. derivable from the motor angular positions sensed by the resolvers 220, 236. Alternatively, direct angular speed measurements can be used where suitable sensors are available.

When the unwinding (supply) and winding (take-up) radii of the film roll are known the angular speed profile shift t1 and t2 can be calculated for the supply and take-up platter respectively for the initial condition of t=0.

$$t_1 = \frac{1}{2 \cdot r_f \cdot d \cdot V_{af}} \cdot (r_f^2 - r_h^2); t_2 = \frac{1}{2 \cdot r_t \cdot d \cdot V_{at}} \cdot (r_t^2 - r_h^2) \quad \text{Equations 8}$$

Once t1 and t2 are calculated, the transfer function H(t) can be properly defined as a function of time and used so that the film transport supply platter can now be ramped up to speed with stability. From this point on the transfer function can be used to modify the take-up platter control signal for use as a speed reference control for the supply platter controller. An assumption can be made by the no-rewind film transport control system 200 in that the linear film speed is known and constant.

By using the transfer function H(t) the supply platter can continue to get a stable angular control reference. This control scheme can also overcome other problems, such as when a momentary airflow disturbs the position of the lead-in film or when erroneous signals from lead-in optical film position sensors are influenced by external light.

Figure 3:
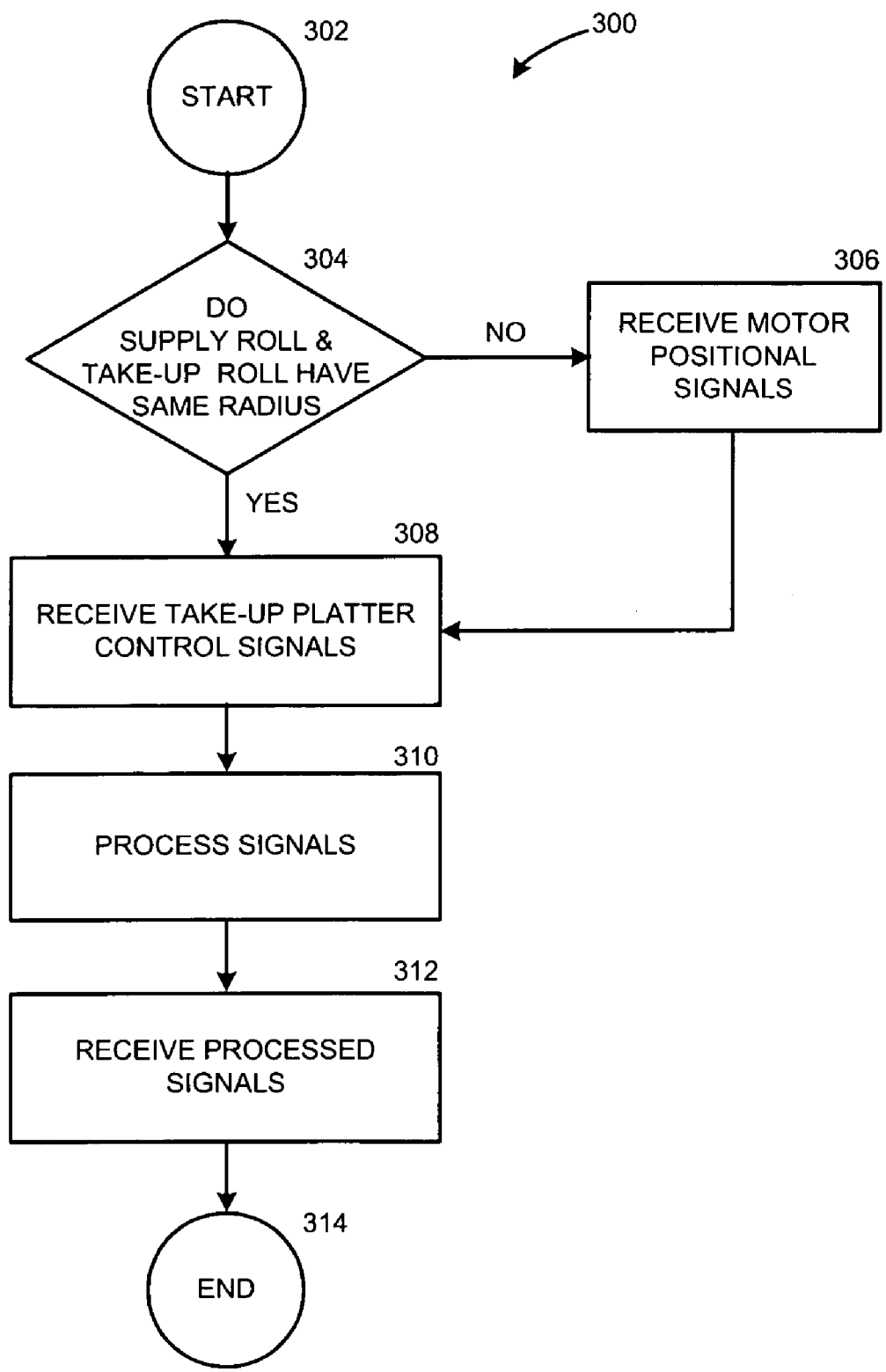
FIG. 3 is a flow diagram illustrating an exemplary method for controlling a film transport control system according to one embodiment of the present invention.

FIG. 3 illustrates an exemplary method 300 that provides a method for controlling a supply platter motor in a no-rewind film transport system. This exemplary method is provided by way of example, as there are a variety of ways to carry out methods according to the present invention. The method 300 shown in FIG. 3 can be executed or otherwise preformed by any of various systems. The method 300 is described below as carried out by the system 200 shown in FIG. 2 by way of example, in various elements of the system 200 are referenced and explaining the example method of FIG. 3. In block 302, the method begins. In block 304, a determination is made by as to whether the supply film roll and take-up film roll have the same or similar radii. This determination can be done manually or can be automated. If in block 304 the supply film roll and take-up film roll are determined to have different radii, then the method 300 proceeds to block 306. In block 306, motor positional signals are received by the processor 201. Supply motor positional signals 206 can be transmitted to the processor 201 by the resolver 220. Take-up motor positional signals 208 can be transmitted to the processor 201 by resolver 236.

If the supply film roll and take-up film roll are determined to have the same or similar radii or after the motor positional signals are determined, method 300 continues at block 308. At block 308, take-up platter control signals 202 are received by the processor 201. When the film rolls have different radii, block 306 and block 308 can occur simultaneously. In block 310, the signals received by the processor 201 are processed. The processor 201 can process the received signals by the use of a transfer function H(t). If the supply film roll and take-up film roll have the same or similar radius, the transfer function can utilize the take-up platter control signals 202 and a correction factor, K, as shown in Equation 3. If the supply film roll and take-up film roll have different radii, then the transfer function can utilize the motor positional signals 206, 208 as expressed in Equation 6. The processing of signals received by the processor 201 can result in processed signals 204.

In block 312, the processed signals 204 can be transmitted to the supply platter controller 214. In one embodiment, the processor 201 resides in the supply platter controller 214 and thus the processed signals do not need to be transmitted to the controller 214. The supply platter controller 214 can use the processed signals 204 to create supply platter control signals that can drive the supply motor 218 via the supply servo drive 216.

In block 316, the method 300 ends.

Figure 4:
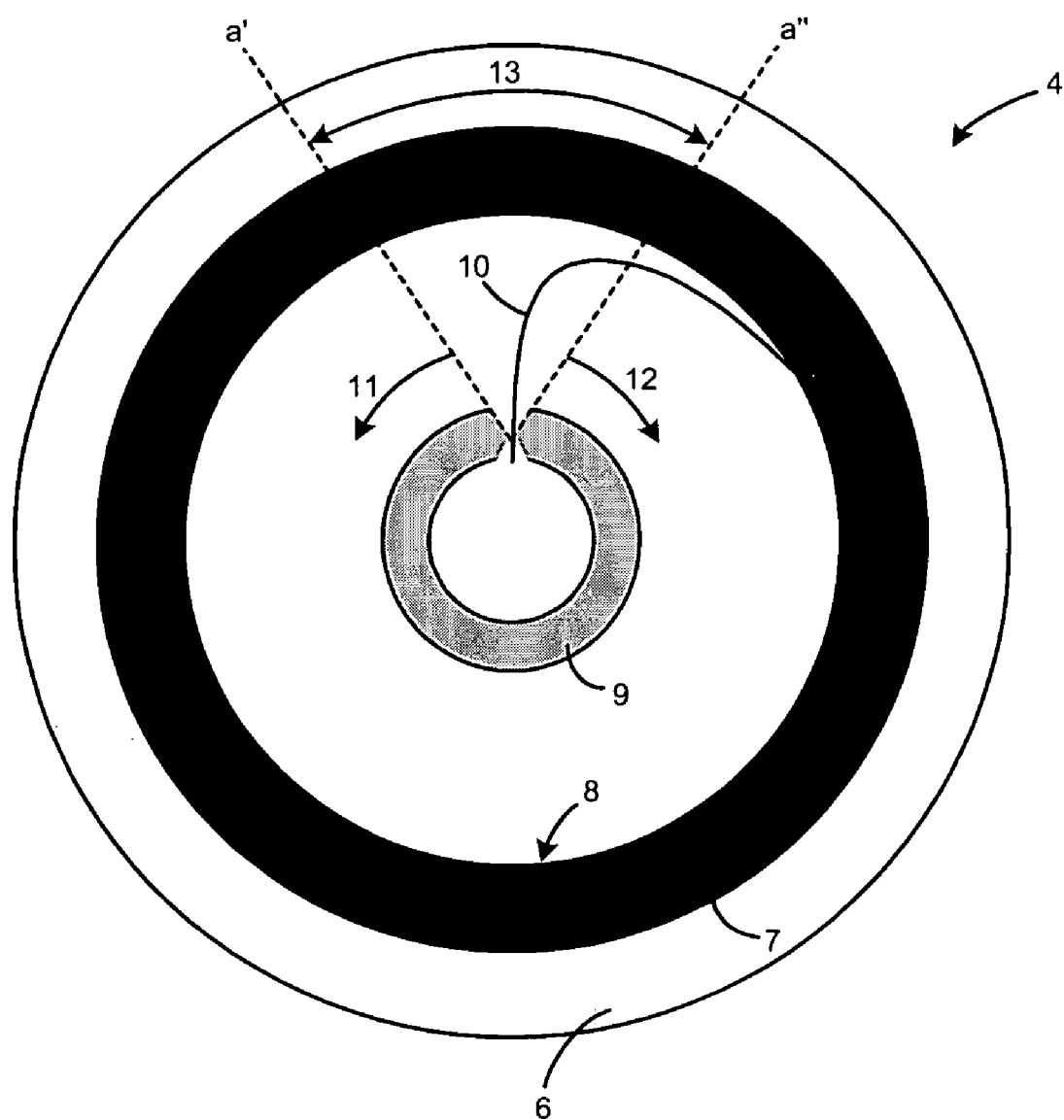
FIG. 4 illustrates a limit switch film position sensing system of a supply platter with film according to one embodiment of the present invention.

Film transport systems in which it is not possible to have angular platter position or speed information, such as motor positional signals, 206, 208, means H(t) may not be properly defined when the supply roll radius is different than the take-up roll outer winding radius. It can be desirable to use a component of the take-up platter control signal 202 to help keep the supply platter control stable, however there may need to be a greater correction acceleration component to compensate for the greater errors in the transfer function H(t). An improved acceleration correction factor can be derived from extracting additional information from the supply platter film position sensor system 222. This technique involves calculating the error between the required and requested platter angular speed as the platter transitions between different platter speed correctional modes of operation. These three platter speed correction modes are: acceleration, deceleration and no speed correction applied. By using a time weighted summing of these speed errors a delta correction speed can be determined and summed with present requested speed signal to get a new requested speed signal that is then applied to the supply servo drive 216. This process can be repeated every time the platter transitions from no correction region to an accelerating or decelerating correction region and back to the no correction region. FIG. 4 shows these three regions for a limit switch film position sensing system 4 of a supply platter 6 with film 7 that has an inner radius 8 that has a lead-in section of film 10 being drawn into a pay-out device 9. When the lead-in film 10 is positioned beyond the platter speed too slow sensing limit, region 11, the platter has to be accelerated to compensate. When the platter angular speed is too fast, the lead-in film is actuating the too fast limit switch, region 12, causing the platter to be decelerated. When the platter speed is close to being the correct angular speed the lead-in film will sit between the film position sensing limits, region 13 and platter angular speed is relatively constant. The region boundary limits are the film positional sensor range limits defined by line a:a' and a:a" between the normal and slow region, and between the normal and fast region, respectively. By using the correction technique described above it is possible to improve the range of film platter loads that can be operated on the supply platter.

Utilizing the present invention a wide range of film platter loads can be used with no-rewind film transport systems in typical show mode configurations with out experiencing instabilities that lead to film damage or equipment damage.

The foregoing description of the preferred embodiments of the invention has been presented only for the purpose of illustration and description and is not intended to be exhaustive or to limit the invention to the precise forms disclosed. Various modifications and changes may be made to the above described film transport control system without departing from the scope of the invention as defined in the claims.

What is claimed is:

1. A method of controlling a supply platter motor in a no-rewind film transport system, comprising:
   receiving take-up platter control signal information from a take-up platter controller;
   processing the take-up platter control signal information based at least in part on a transfer function to produce processed take-up platter control signal information, wherein the transfer function is a ratio of angular speed of a take-up platter and reguired angular speed of a supply platter; and
   controlling the supply platter motor based at least in part on the processed take-up platter control signal information.

2. The method of claim 1, wherein the transfer function comprises a correction factor.

3. A method of claim 1, wherein the processing occurs as a function of time.

4. A method of claim 1, wherein when a supply film roll on the supply platter has an inner radius approximately equal to an outer radius of a take-up film roll on a take-up platter, the transfer function is substantially constant.

5. The method of claim 4, wherein the take-up platter control signal information, the supply platter motor speed or positional signal information and take-up platter motor speed or positional signal information are processed by a transfer function.

6. The method of claim 1, further comprising receiving supply platter motor speed or positional signal information and take-up platter motor speed or positional signal information and processing the supply platter motor speed or positional signal information and take-up platter motor speed or positional signal information, wherein the supply platter motor is controlled based at least in part on the processed supply platter motor speed or positional signal information and the processed take-up platter motor speed or positional signal information.

7. A method of claim 1, further comprising increasing stability of supply platter motion based at least in part on the processed take-up platter control signal information.

8. The method of claim 1, further comprising:
   determining a time taken for a lead-in film position on the supply platter, to transition predefined limits of supply platter acceleration or deceleration based at least in part on supply platter film lead-in position feedback;
   determining a speed error between a supply platter reference speed signal and a supply platter speed control signal at the time of the transition;
   determining a corrected supply platter speed control signal based at least in part on the speed error signal and the supply platter reference speed signal; and
   controlling the supply platter based at least in part on the corrected supply platter speed control signal.

9. A method of improving supply platter motion in a no-rewind film transport system, comprising:
   determining a time taken for a lead-in film position on a supply platter to transition predefined limits of supply platter acceleration or deceleration based at least in part on supply platter film lead-in position feedback;
   determining a speed error between a supply platter reference speed signal and a supply platter speed control signal at the time of the transition;
   determining a corrected supply platter speed control signal based at least in part on the speed error signal and the supply platter reference speed signal; and
   controlling the supply platter based at least in part on the corrected supply platter speed control signal.

10. A no-rewind film transport system, comprising:
    a take-up platter controlled by a take-up platter motor;
    a take-up platter controller capable of controlling the take-up platter motor through take-up platter control signals;
    a processor capable of receiving and processing the take-up platter control signals based at least in part on a transfer function to produce processed take-up platter control signal information;
    a supply platter controlled by a supply platter motor;
    a supply platter controller capable of receiving the processed take-up platter control signal information and controlling the supply platter motor at least in part with the processed take-up platter control signals information,
    wherein the transfer function is a ratio of angular speed of the take-up platter and required angular speed of the supply platter.

11. The system of claim 10, wherein the supply platter controller comprises the processor.

12. A system according to claim 11, wherein when a supply film roll on the supply platter has an inner radius approximately equal to an outer radius of a take-up film roll on the take-up platter, the transfer function is substantially constant.

13. The system of claim 10, wherein the transfer function comprises a correction factor.

14. The system of claim 10, further comprising:
- at least one supply platter motor speed or positional sensor producing supply platter motor speed or positional signals; and
- at least one take-up platter motor speed or positional sensor producing take-up platter motor speed or positional signal information,
- wherein the processor is capable of receiving and processing the supply platter motor speed or positional signal information and the take-up platter motor speed or positional signal information.

15. The system of claim 14, wherein the supply platter motor is controlled by the supply platter controller based at least in part on the processed supply platter motor speed or positional signal information and the processed take-up platter motor speed or positional signal information.

16. The system of claim 15, wherein the processor processes the take-up platter control signal information, the supply platter motor speed or positional signal information and take-up platter motor speed or positional signal information with the transfer function.

17. The system of claim 10, wherein stability of supply platter motion is increased based at least in part of the processed take-up platter control signals.

18. The system of claim 10, wherein the transfer function is a function of time.

19. The system of claim 18, wherein a supply film roll on the supply platter has an inner radius approximately equal to an outer radius of a take-up film roll on the take-up platter, the transfer function is substantially constant.

20. The system of claim 10, wherein stability of supply platter motion is increased based at least in part on the processed take-up platter control signals.

21. A method of upgrading performance of a no-rewind film transport system, comprising:
- adapting the system so that take-up platter control signal information is processed based at least in part on a transfer function to produce processed take-up platter control signal information, wherein the transfer function is a ratio of angular speed of a take-up platter and required angular speed of a supply platter; and
- a supply platter motor is controlled at least in part based on the processed take-up platter control signal information.

* * * * *